United States Patent
Corbett et al.

[15] 3,637,978
[45] Jan. 25, 1972

[54] ELECTRIC STEAM VAPORIZER

[72] Inventors: William H. Corbett; Albert D. Brunell; George A. Koharchik, all of Somerset, Pa.

[73] Assignee: Champion Spark Plug Company, Toledo, Ohio

[22] Filed: June 30, 1970

[21] Appl. No.: 51,158

[52] U.S. Cl.............................219/284, 21/119, 128/192, 219/271, 219/314
[51] Int. Cl.................................H05b 3/60, A61m 15/00
[58] Field of Search..........................219/271–276, 314, 219/284–296; 128/192; 21/118, 119

[56] References Cited

UNITED STATES PATENTS

| | | | |
|---|---|---|---|
| 2,847,547 | 8/1958 | Gordon | 219/314 X |
| 1,430,548 | 10/1922 | Hogue | 219/273 |
| 3,518,409 | 6/1970 | Corbett | 219/284 X |
| 2,533,794 | 12/1950 | Hanks et al. | 219/290 X |
| 2,688,686 | 9/1954 | Johnson | 219/272 X |
| 1,944,348 | 1/1934 | Kelley | 219/285 |
| 2,211,407 | 8/1940 | Christensen | 219/272 |

*Primary Examiner*—A. Bartis
*Attorney*—Owen & Owen

[57] ABSTRACT

The invention is an electric steam vaporizer having an insulating chamber open to atmosphere. One embodiment includes a water receptacle insulated against heat transfer from a boiling chamber by relatively cooler liquid in a housing and by an open-bottomed air-filled insulating chamber in contact with outside atmosphere adjacent said housing and said receptacle. The boiling chamber has a cover, a continuous sidewall and a base wall with a fluid passage. The chamber is mounted within the housing. The housing has an impervious inner wall, a bottom wall, and an impervious outer skirt spaced at a substantial distance from the inner wall by an impervious top wall. An air-filled insulating chamber, defined by the inner wall, the outer skirt, and the top wall, is in contact with outside atmosphere through an opening in the water receptacle. Fluid flows from the receptacle through a restricted supply port into the chamber housing and from there through the fluid passage into the boiling chamber where it is vaporized by two spaced-apart electrodes. The vapor passes through a steam discharge port in the cover, over a liquid medicant well portion and into atmosphere. The second embodiment is of a safe electric steam vaporizer identical to the first embodiment except that the open-to-atmosphere, air-filled insulating chamber in contact with outside atmosphere is contiguous with the boiling chamber and the water receptacle.

4 Claims, 4 Drawing Figures

PATENTED JAN 25 1972
3,637,978
SHEET 1 OF 2
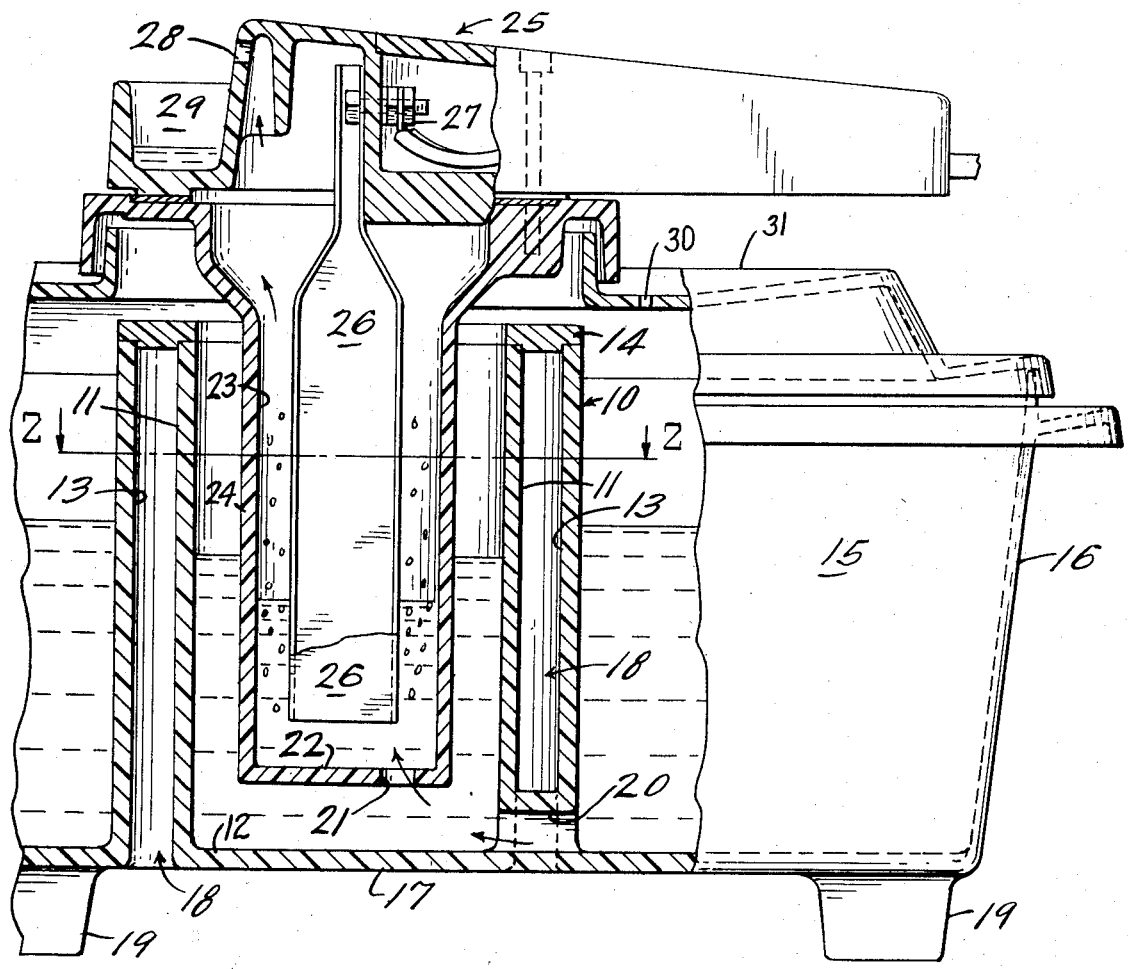
FIG-1-
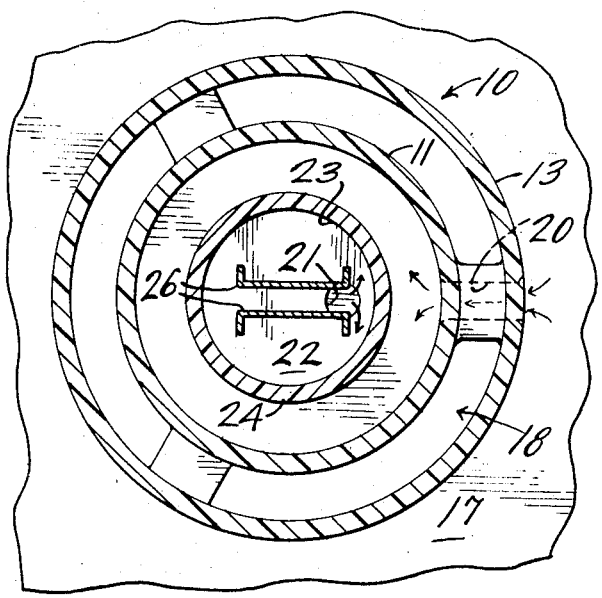
FIG-2-
INVENTORS:
WILLIAM H. CORBETT,
ALBERT D. BRUNELL,
GEORGE M. KOHARCHIK.
BY Owen + Owen
ATT'YS.

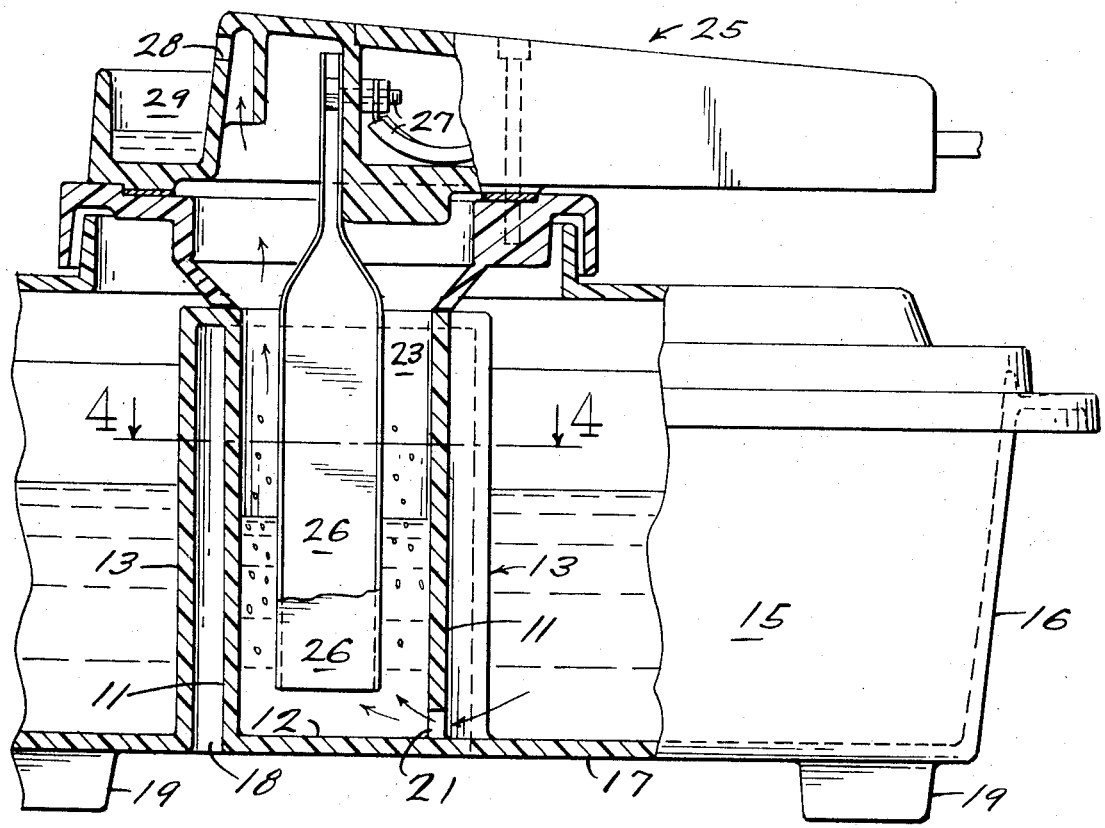
FIG-3-
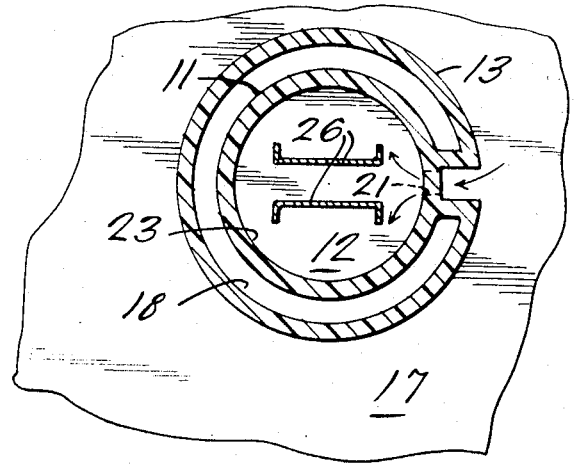
FIG-4-
INVENTORS:
WILLIAM H. CORBETT,
ALBERT D. BRUNELL,
GEORGE M. KUHARCHIK.
BY Owen & Owen ATT'YS.

3,637,978

ELECTRIC STEAM VAPORIZER

SUMMARY OF THE INVENTION

A first embodiment of the invention comprises an electric steam vaporizer including an air filled insulating chamber located between a chamber housing a boiling chamber and a water receptacle. The chamber housing contains liquid of relatively lower temperature than that in the boiling chamber and said insulating chamber is exposed to outside atmosphere. The air temperature in the chamber approaches atmospheric temperature to maintain a significant temperature differential between the boiling chamber and the water receptacle over prolonged periods of operation. A second vaporizer embodiment includes an open-to-atmosphere air-filled insulating chamber contiguous with the boiling chamber and the water receptacle.

BACKGROUND OF THE INVENTION

The present invention contemplates an improvement over the open-bottomed air-filled insulating chamber-type vaporizer disclosed and claimed in U.S. letters Pat. No. 3,518,409, granted June 30, 1970.

Steam vaporizers of the general type contemplated by the present invention are adapted to provide a steam vapor alone or in combination with a vaporized medicant. Such vaporizers are used in sick rooms to relieve colds, bronchitis, and other respiratory ailments, often such vaporizers are used in the home, for example, in the bedrooms of small children.

One of the major disadvantages of prior art vaporizers of this type was that the temperature of the water which remained in the water receptacle at a location exterior of the boiling chamber became very hot after prolonged use. Vaporizers of this type are expected to operate continuously for as long as 12 hours without refilling. It was therefore not unusual for the water temperature of the receptacle water exterior of the boiling chamber to approach scalding temperatures after long periods of operation due to constant application of heat to the unit. The vaporizer disclosed in U.S. Pat. No. 3,518,409 alleviates this problem by providing an open-bottomed insulating chamber contiguous the boiling chamber of a steam vaporizer which extends from a cover into a water receptacle. A dead air space is thereby created between the water receptacle and the area of the boiling chamber. This dead air space provides an insulating area which maintains the water in the water receptacle at a temperature lower than that in the boiling chamber.

It has been found that by exposing the opening of the air-filled insulating chamber to atmosphere through the water receptacle, the heat in the insulating chamber will be exchanged with the relatively cooler atmospheric temperature thus retarding heat increases within the insulating chamber. In this manner, the insulating chamber remains a heat transfer barrier between the boiling chamber and the water receptacle contiguous with the outer wall of the insulating chamber over prolonged periods of operation.

It is accordingly an object of the present invention to provide a safe electric steam vaporizer which retards significant heat increases in the water in the receptacle which would cause heated water injuries.

DESCRIPTION OF THE DRAWINGS

FIG. 1 is an elevational view of an electric steam vaporizer illustrating a first embodiment of the invention with parts cut away;

FIG. 2 is a cross-sectional view of the electric steam vaporizer shown in FIG. 1 taken along line 2—2;

FIG. 3 is an elevational view of an electric steam vaporizer illustrating a second embodiment of the invention with parts cut away;

FIG. 4 is a cross-sectional view of the electric steam vaporizer shown in FIG. 3 taken along line 4—4.

DESCRIPTION OF THE PREFERRED EMBODIMENTS

Referring to FIGS. 1 and 2, the first embodiment of an electric steam vaporizer having an open-to-atmosphere double-walled insulating chamber is shown. A housing 10 having an inner wall 11, a bottom wall 12, and an impervious outer skirt 13 spaced a substantial distance from the inner wall 11 by a top wall 14 is positioned in a water receptacle 15. The water receptacle 15 comprises a continuous sidewall 16 and a floor 17 for containing water therein. The inner wall 11, the outer skirt 13 and the top wall 14 define an open-bottomed air-filled insulating chamber 18. Openings 30 defined by a closure 31 over the water receptacle 15 facilitate dissipation of heat from the interior of the housing 10 to atmosphere.

The inner wall 11 and the outer skirt 13 of the open-bottomed insulating chamber 18 extend through the floor 17 of the water receptacle 15 to expose the interior of the insulating chamber 18 to outside atmosphere. The insulating chamber 18 is of sufficient size (preferably greater than 0.25 inch spacing between the inner wall 11 and the outer skirt 13) to facilitate constant heat exchange between the relatively hotter air within the chamber 18 and the relatively cooler atmospheric air. Legs 19 are fixed to the floor 17 of the water receptacle 15 to provide for the passage of air across the opening of the insulating chamber 18.

A restricted fluid passage 20 for introducing water from the water receptacle 15 to the interior of the housing 10 bridges the open-bottomed insulating chamber 18. Fluid thus flows from the water receptacle 15 into the boiling chamber housing 10, and then through a fluid passage 21 defined by a base 22 of a boiling chamber 23 having a wall 24 and a cover 25. A pair of longitudinally extending, spaced-apart electrodes 26, in electrical communication with two electrical terminals 27, extend through the cover 25 and heat the water introduced into the boiling chamber 23. The steam from the boiling chamber passes through a steam discharge port 28 defined by the cover 25 and over a liquid medicant well portion 29.

In the present embodiment the water in the receptacle 15 is insulated from the heat of the boiling chamber 23 by the insulating chamber 18 which is open to atmosphere and the relatively cooler liquid within the housing 10. The water in the water receptacle 15 is thus maintained at a safe, nonscalding temperature despite prolonged operation of the vaporizer unit.

It has been found that the temperature achieved in the receptacle 15 during prolonged operation of a steam vaporizer can also be minimized by means of the second simplified embodiment of the invention shown in FIGS. 3 and 4. The inner wall 11 and the bottom wall 12 define the boiling chamber 23 having the cover 25 attached thereto. The open-bottomed insulating chamber 18, which is open to atmosphere, is thus contiguous with the receptacle 15 and the boiling chamber 23. Fluid is introduced through the restricted fluid passage 21, bridging the insulating chamber 18, directly into the boiling chamber 23 where it is vaporized and released to atmosphere in the same manner as that described in the first embodiment of the invention.

In either embodiment, the open-to-atmosphere insulating chamber 18 provides a means whereby the heated water of an electric steam vaporizer is isolated to a small and protected area near the heating electrodes thereby facilitating safe operation of the vaporizer over prolonged periods of time.

I claim:

1. An electric steam vaporizer comprising, in combination, a water receptacle having a sidewall and floor for containing water within said receptacle, said receptacle including a housing having an inner wall, a bottom wall, an impervious outer skirt spaced from said inner wall, an impervious top wall extending between said inner wall and said outer skirt, said inner wall, said outer skirt and said top wall defining an open-bottomed air-filled insulating chamber extending through said floor and in contact with outside atmosphere, said insulating chamber being capable of retarding heat transfer between the interior of said housing and water within said receptacle exterior of said housing, fluid passage means from said receptacle into said housing, a boiling chamber mounted within said housing and having a cover, a sidewall, and a bottom wall defining a fluid supply opening to the interior of said boiling chamber, said inner wall of said housing being spaced from said sidewall of said boiling chamber and defining therebetween a water-filled space effective to retard heat transfer between said housing and said boiling chamber, said cover having a liquid well portion and a steam discharge port defined by said cover at a location adjacent to and above said liquid well portion, and a pair of longitudinally extending electrodes extending downwardly in spaced relationship into said boiling chamber.

2. An electric steam vaporizer according to claim 1 wherein the inner wall of said housing is spaced at a predetermined distance from said outer skirt of said housing whereby the open-bottomed air-filled insulating chamber in contact with outside atmosphere is subjected to a constant and substantial heat exchange with outside atmosphere during the operation of said vaporizer.

3. An electric steam vaporizer according to claim 2 wherein such predetermined distance exceeds 0.25 inch.

4. An electric steam vaporizer according to claim 2 wherein said fluid passage means comprises a restricted inlet port whereby heat transfer from said housing to said water receptacle through said restricted fluid passage means is substantially retarded.

* * * * *